United States Patent
Dziurda

(10) Patent No.: US 10,328,887 B2
(45) Date of Patent: Jun. 25, 2019

(54) ROOF-MOUNTED ENERGY ABSORBING COUNTERMEASURE

(71) Applicant: GM Global Technology Operations LLC, Detroit, MI (US)

(72) Inventor: Robert A. Dziurda, Warren, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 24 days.

(21) Appl. No.: 15/597,848

(22) Filed: May 17, 2017

(65) Prior Publication Data

US 2018/0334127 A1 Nov. 22, 2018

(51) Int. Cl.
*B60R 13/02* (2006.01)
*B60R 21/04* (2006.01)
(Continued)

(52) U.S. Cl.
CPC ........ *B60R 21/214* (2013.01); *B60R 13/0212* (2013.01); *B60R 21/0428* (2013.01); *B60R 21/13* (2013.01); *B60R 21/264* (2013.01); *B60R 2013/0287* (2013.01); *B60R 2021/0442* (2013.01); *B60R 2021/138* (2013.01);
(Continued)

(58) Field of Classification Search
CPC ..... B60R 21/13; B60R 21/213; B60R 21/214; B60R 21/264; B60R 21/38; B60R 2021/0253; B60R 2021/23192; B60R 2021/26029; B60R 21/0428;
(Continued)

(56) References Cited

U.S. PATENT DOCUMENTS

| 5,775,726 A * | 7/1998 | Timothy ............... B60R 21/013 280/730.1 |
| 6,102,436 A * | 8/2000 | Bayley ................ B60R 13/0225 280/748 |

(Continued)

FOREIGN PATENT DOCUMENTS

| DE | 10039802 A1 | 2/2002 |
| DE | 10063765 A1 | 7/2002 |
| JP | 2012011921 A * | 1/2012 |

OTHER PUBLICATIONS

Inflators in Airbags—Supplemental Restraint Systems; The LemurZone Airbag Pages; http://www.lemurzone.com/airbag/inflate.htm; accessed on Apr. 11, 2017; 3 pages.

(Continued)

*Primary Examiner* — Laura Freedman

(57) ABSTRACT

A roof-mounted energy absorbing countermeasure system for use in a vehicle is provided. In one example, the system may include an impact detection module configured to detect whether a vehicle has experienced an impact and generate an impact detection signal in response thereto. The system may also include a countermeasure disposed between an outer roof panel of the vehicle and an inner roof panel of the vehicle. The outer roof panel and the inner roof panel may be separated by a first distance in a pre-impact state. The countermeasure may be configured to deploy, in response to generation of the impact detection signal, so as to cause at least a portion of the outer roof panel and at least a portion of the inner roof panel to be separated by a second distance that is greater than the first distance.

13 Claims, 22 Drawing Sheets

(51) Int. Cl.
   *B60R 21/13*     (2006.01)
   *B60R 21/214*    (2011.01)
   *B60R 21/231*    (2011.01)
   *B60R 21/264*    (2006.01)
   *B60R 21/26*     (2011.01)

(52) U.S. Cl.
   CPC ............ *B60R 2021/23192* (2013.01); *B60R 2021/26029* (2013.01)

(58) Field of Classification Search
   CPC ...... B60R 2021/138; B60R 2021/0442; B60R 13/0212; B60R 2013/0287
   See application file for complete search history.

(56) References Cited

U.S. PATENT DOCUMENTS

| | | | | |
|---|---|---|---|---|
| 6,123,355 A * | 9/2000 | Sutherland | ............ | B60R 21/231 280/728.2 |
| 6,231,072 B1 * | 5/2001 | Pywell | ................... | B60R 21/02 280/730.2 |
| 6,419,177 B2 | 7/2002 | Stevens | | |
| 6,457,740 B1 * | 10/2002 | Vaidyaraman | ........ | B60R 21/231 280/730.2 |
| 6,588,793 B2 * | 7/2003 | Rose | ................... | B60R 21/2171 280/728.2 |
| 7,364,185 B2 * | 4/2008 | Mori | ................... | B60N 2/42745 280/730.1 |
| 7,556,117 B2 * | 7/2009 | Browne | ................. | B60R 21/38 180/274 |
| 7,686,120 B2 * | 3/2010 | Browne | ................. | B60R 21/38 180/274 |
| 8,763,744 B2 * | 7/2014 | Matsuda | ................ | B60R 21/38 180/274 |

OTHER PUBLICATIONS

William Machin; "How Do Push Rods Work?"; http://www.livestrong.com/article/355101-how-do-push-rods-work/; Jan. 11, 2011; 2 pages.
Marshall Brain; "How Airbags Work"; http://auto.howstuffworks.com/car-driving-safety/safety-regulatory-devices/airbag.htm; accessed on Apr. 11, 2017; 11 pages.
First Office Action for German Application No. 10 2018 111 644.6 dated Jan. 25, 2019; 7 pages.

* cited by examiner

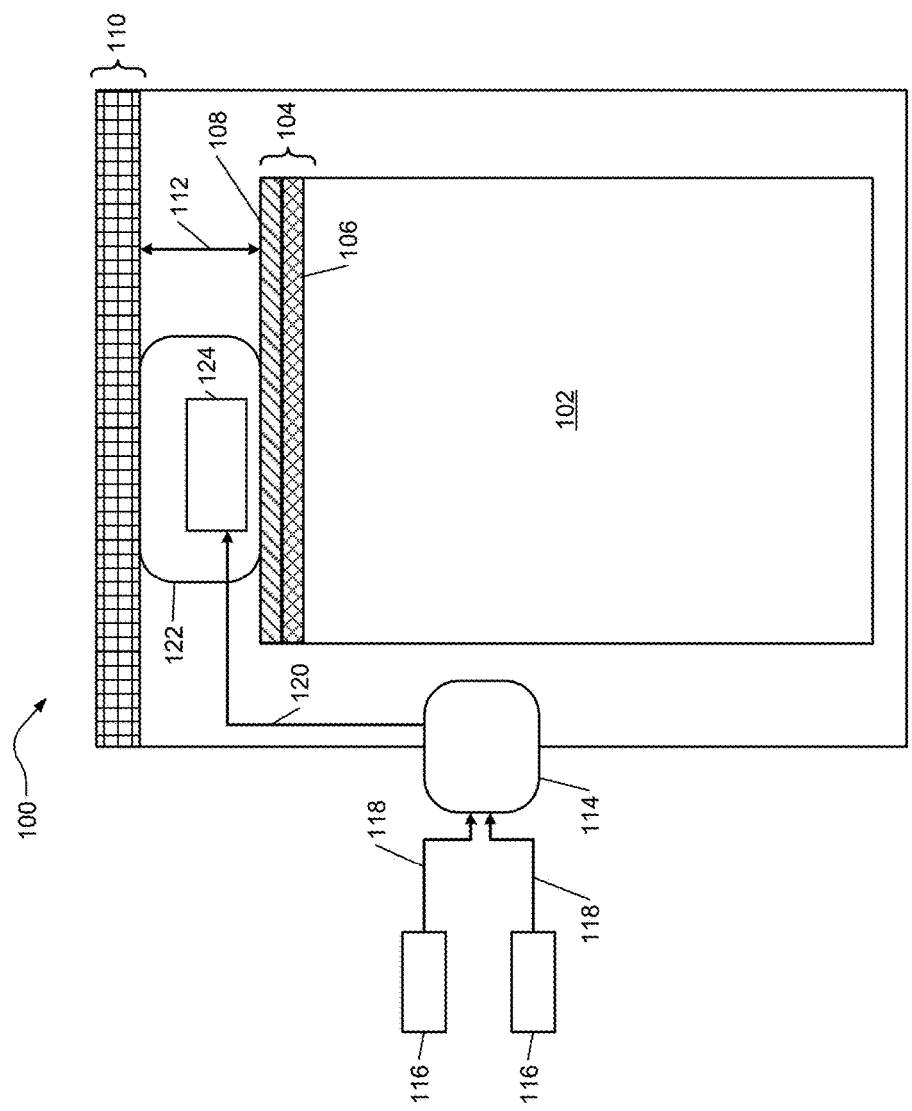

ROOF-MOUNTED ENERGY ABSORBING COUNTERMEASURE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicles and, more particularly, to an energy absorbing countermeasure capable of increasing the distance between an outer roof panel and an inner roof panel.

An energy absorbing countermeasure is a device disposed between an outer wall and an inner wall of a vehicle designed to absorb energy from an impact in the event of a crash or rollover. One specific type of energy absorbing countermeasure is a roof-mounted energy absorbing countermeasure. A roof-mounted energy absorbing countermeasure is a countermeasure disposed between an outer roof panel and an inner roof panel of a vehicle. In the event of a rollover, for example, this type of countermeasure may absorb the force of an occupant's head hitting the inner roof panel, thereby mitigating the harm inflicted upon the occupant.

Conventional roof-mounted energy absorbing countermeasures occupy a fixed amount of space between the inner and outer roof panels. To account for the vertical space occupied by the roof-mounted energy absorbing countermeasures, it was often necessary to either reduce the amount of headroom between an occupant's head and the inner roof panel, or increase the height of the vehicle. Reducing the amount of headroom can result in an unfavorable experience for an occupant, while increasing the height of the vehicle can hinder the vehicle's performance.

SUMMARY

Further areas of applicability of the present disclosure will become apparent from the detailed description, the claims and the drawings. The detailed description and specific examples are intended for purposes of illustration only and are not intended to limit the scope of the disclosure.

In a feature, a roof-mounted energy absorbing countermeasure system is provided. The system may include an impact detection module configured to detect whether a vehicle has experienced an impact and generate an impact detection signal in response thereto. The system may also include a countermeasure disposed between an outer roof panel of the vehicle and an inner roof panel of the vehicle. The outer roof panel and the inner roof panel may be separated by a first distance in a pre-impact state. The countermeasure may be configured to deploy, in response to generation of the impact detection signal, so as to cause at least a portion of the outer roof panel and at least a portion of the inner roof panel to be separated by a second distance, wherein the second distance is greater than the first distance.

In another feature, the countermeasure may include a flexible chamber configured to deploy by inflating.

In one feature, the countermeasure may include an outer cup having an opening facing the inner roof panel, an inner cup disposed at least partially within the opening of the outer cup, and an actuator disposed at least partially within the inner cup. The actuator may be configured to deploy in response to generation of the impact detection signal so as to cause the inner cup to exert a force on the inner roof panel. In a feature, the actuator may be configured to deploy by inflating. In another feature, the actuator may be configured to deploy by exploding. In one feature, the outer cup is more rigid than the inner cup. In another feature, the countermeasure further includes one or more flexible members connecting the outer cup to the inner cup.

In a feature, the countermeasure may include a wedge configured to deploy by moving from a first position to a second position. In one feature, the inner roof panel may include a complementary wedge configured to absorb a force from the wedge upon deployment of the wedge. In another feature, the system may include a pretensioner operatively connected to the wedge and configured to deploy the wedge by pulling the wedge from the first position to the second position. In still another feature, the system may include a push rod operatively connected to the wedge and configured to deploy the wedge by pushing the wedge from the first position to the second position.

In one feature, the countermeasure may include a hinged expander configured to deploy by expanding in a direction perpendicular to the outer roof panel. In a feature, the hinged expander may include a hinge, a first arm including a first end connected to the outer roof panel and a second end connected to the hinge, and a second arm including a first end connected to the inner roof panel and a second end connected to the hinge. In another feature, the system may include a pretensioner operatively connected to the hinged expander and configured to deploy the hinged expander by pulling at least a portion of the hinged expander from a first position to a second position. In yet another feature, the system may include a push rod operatively connected to the hinged expander and configured to deploy the hinged expander by pushing at least a portion of the hinged expander from a first position to a second position.

In a feature, the countermeasure may include a rotating cam including a first end and a second end rotatably connected to the outer roof panel at a pivot point. The rotating cam may be configured to deploy by rotating about the pivot point. In one feature, the system may include a pretensioner operatively connected to the rotating cam and configured to deploy the rotating cam by pulling at least a portion of the rotating cam from a first position to a second position. In another feature, the system may include a push rod operatively connected to the rotating cam and configured to deploy the rotating cam by pushing at least a portion of the rotating cam from a first position to a second position.

In one feature, the inner roof panel of the vehicle may include a trim layer. In another feature, the inner roof panel of the vehicle may include a substrate layer adjacent the trim layer.

BRIEF DESCRIPTION OF THE DRAWINGS

The present disclosure will become more fully understood from the detailed description and the accompanying drawings, wherein:

FIG. 1b is a functional block diagram of a vehicle including another example roof-mounted energy absorbing countermeasure system;

FIG. 2c is a cross-sectional view of a roof-rail of a vehicle including the example implementation of the roof-mounted energy absorbing countermeasure system of FIG. 2a;

FIG. 3c is a cross-sectional view of a roof-rail of a vehicle including the example implementation of the roof-mounted energy absorbing countermeasure system of FIG. 3a;

In the drawings, reference numbers may be reused to identify similar and/or identical elements.

DETAILED DESCRIPTION

Figure 1A:
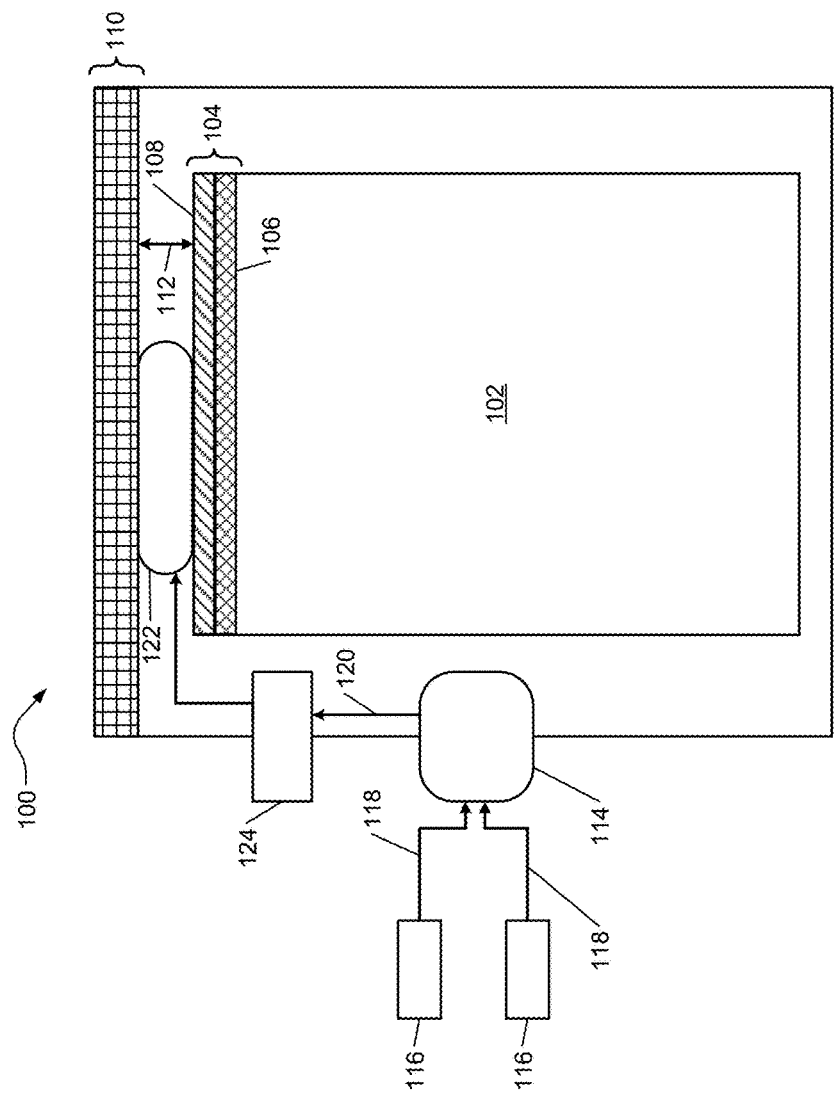
FIG. 1a is a functional block diagram of a vehicle including an example roof-mounted energy absorbing countermeasure system.

Referring now to FIG. 1a, an example vehicle 100 including a vehicle cabin 102 is shown. The vehicle 100 may be any type of vehicle that travels over a road surface, such as, but not limited to, an automobile. The vehicle 100 includes an outer roof panel 110 separated from an inner roof panel 104 by a distance 112. In one example, the outer roof panel 110 may constitute a more rigid material than the inner panel 104. For example, in some implementations, the outer roof panel 110 may constitute a metal alloy or the like, while the inner roof panel 104 may constitute a less rigid metal alloy or the like, plastic, fabric, foam or any suitable combination thereof.

In one example, the inner roof panel 104 may include a trim layer 106 and a substrate layer 108 adjacent the trim layer 106. In some implementations, the trim layer 106 and the substrate layer 108 may constitute different materials. For example, the trim layer 106 may constitute a fabric and the substrate layer may constitute a plastic or foam. Of course, those having ordinary skill will recognize that the trim layer 106 and substrate layer 108 may be manufactured from any suitable materials without deviating from the teachings of this disclosure. In addition, in some implementations, the trim layer 106 and the substrate layer 108 may be manufactured from the same material or materials.

A roof-mounted energy absorbing countermeasure (hereinafter "countermeasure") 122 is disposed between the outer roof panel 110 and the inner roof panel 104. Although only a single countermeasure 122 is shown, it is appreciated that a plurality of countermeasures may be included between the outer roof panel 110 and the inner roof panel 104, in some implementations. For example, in one implementation, a first countermeasure 122 may be disposed above the driver's seat, while a second countermeasure 122 may be disposed above the passenger seat. In another example, a single contiguous countermeasure 122 may run the width of the roof and/or the length of the roof. As discussed in additional detail below, a given countermeasure 122 may be implemented in a variety of different manners.

The vehicle 100 also includes an impact detection module 114 operatively connected to one or more sensors 116 and an actuator 124. The one or more sensors 116 are configured to sense observable conditions of the vehicle 100 and generate one or more sensor signals 118 based thereon. The sensor signals 118 may directly, or indirectly, convey dynamical parameters of the vehicle 100 including, but not limited to: whether the vehicle has been deformed in any way, torsion bar torque, EPS motor torque, yaw rate, longitudinal speed, longitudinal acceleration, lateral acceleration, road wheel angle, torsion bar angle, pneumatic trail, mechanical trail, and front slip stiffness coefficient. In one example, the one or more sensors may include an accelerometer configured to detect abrupt changes in vehicle acceleration (e.g., changes above a certain predefined threshold) that are indicative of a vehicle impact scenario. The actuator 124 is configured to deploy the countermeasure 122 in certain example implementations. Furthermore, although shown as a separate component from the countermeasure 122 in FIG. 1a, in some examples (e.g., in the example shown in FIG. 1b), the actuator 124 may be part of the countermeasure 122.

In operation, the countermeasure 122 may be deployed so as to increase the distance between the outer roof panel 110 and the inner roof panel 104 upon detection that the vehicle 100 has experienced an impact (e.g., in a crash or rollover scenario). Increasing the distance between the outer roof panel 110 and the inner roof panel 104 results in an increased volume of crush space, which improves the vehicle's ability to (i) absorb an impact from an occupant against the inner roof panel 104 and (ii) prohibit, to the extent possible, an occupant from having their momentum stopped abruptly by the outer roof panel 110 (which, in some examples, is far more rigid than the inner roof panel 104). In this manner, the countermeasure 122 may be deployed to provide a cushion for an occupant to contact in a crash or rollover scenario, thereby mitigating the harm to the occupant.

In one example, the countermeasure 122 may be deployed as follows. The impact detection module 114 analyzes the sensor signal(s) 118 from the sensor(s) 116 and detects whether the vehicle 100 has experienced an impact. By way of example and not limitation, the impact detection module 114 may detect that the vehicle 100 has experienced an impact because of an abrupt change in the vehicle's speed and/or acceleration, because part of the vehicle has been deformed, and/or via any other suitable techniques for detecting vehicle impact known in the art.

Upon detection that the vehicle 100 has experienced an impact, the impact detection module 114 generates an impact detection signal 120. The impact detection signal 120 may be obtained (i.e., fetched or received) by the actuator 124. The actuator 124, in turn, deploys the countermeasure 122 so as to increase the distance between the outer roof panel 110 and the inner roof panel 104 relative to a pre-impact state (i.e., prior to a detection that the vehicle 100 experienced an impact). In some examples, following deployment of the countermeasure 122, the entire outer roof panel 110 may not be separated from the entire inner roof panel 104 by a greater distance. Rather, in these examples, only a portion of the outer roof panel 110 may be separated from inner roof panel 104 by a greater distance. As discussed below, the countermeasure 122 and actuator 124 may be implemented according to a variety of different example configurations.

FIG. 1b illustrates another example of the vehicle 100 of FIG. 1a. In the example implementation shown in FIG. 1b, the actuator 124 is included as part of the countermeasure 122. Additional details concerning example implementations where the actuator 124 is included as part of the countermeasure 122 are provided below.

Figure 2A:
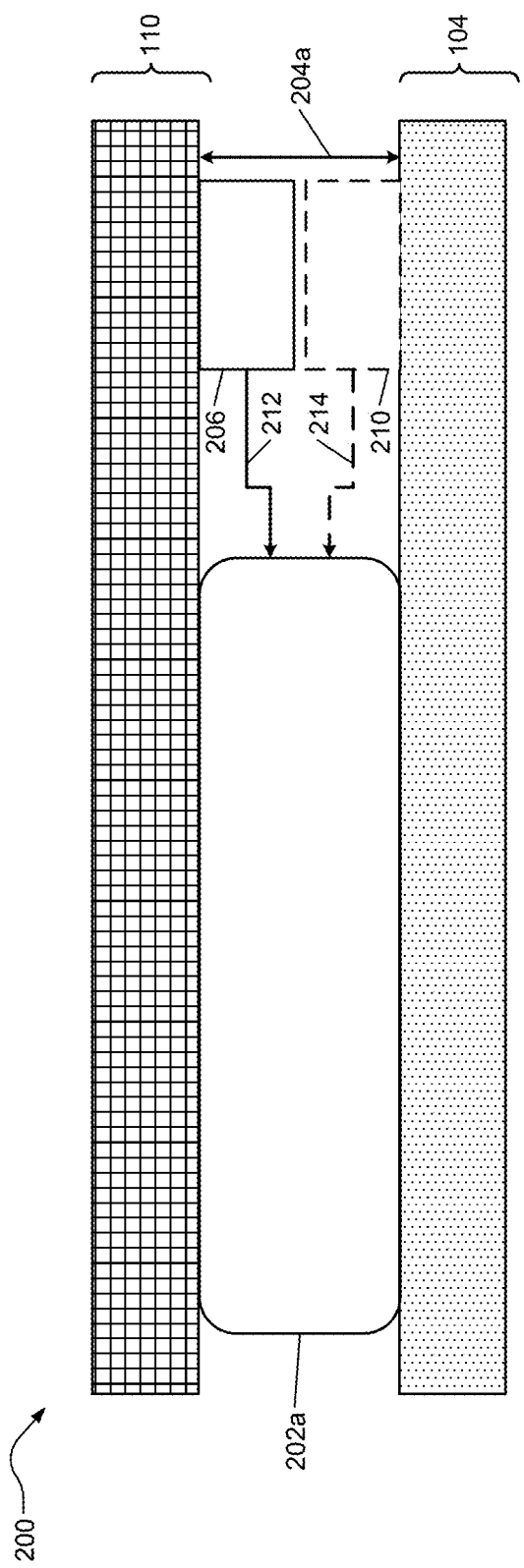
FIG. 2a is a functional block diagram of an example implementation of a roof-mounted energy absorbing countermeasure system in a pre-impact state.

FIG. 2a illustrates an example implementation of a countermeasure system 200 for use in the roof of a vehicle. More specifically, FIG. 2a shows a countermeasure 202a disposed between the outer roof panel 110 and the inner roof panel 104 in a pre-impact state. In the pre-impact state, the outer roof panel 110 and the inner roof panel 104 are separated by a distance 204a. In the example implementation shown in FIG. 2a, the countermeasure 202a may constitute a flexible chamber or the like. In one example, the flexible chamber may be manufactured from a flexible material, such as a nylon fabric or the like, although other suitable materials may be equally employed.

The countermeasure 202a is operatively connected to an actuator, such as actuator 206 or actuator 210, configured to deploy the countermeasure 202a following detection that the vehicle has experienced an impact and generation of an impact detection signal. In one example, the actuator may constitute a pressurized cartridge-type actuator 206 that includes a cartridge of pressurized gas (e.g., $CO_2$) having a release valve. In this example, the actuator 206 is configured to open the release valve, upon reception of the impact detection signal, releasing the pressurized gas 212 into the flexible chamber of the countermeasure 202a, thereby causing the flexible chamber to inflate and expand in volume. In another example, the actuator may constitute a pyrotechnic-type actuator 210. In this example, the actuator 210 is configured to ignite a solid propellant (e.g., sodium azide), upon reception of the impact detection signal, producing a flexible-chamber inflating gas 214 (e.g., nitrogen) that is released into the flexible chamber of the countermeasure 202a, thereby causing the flexible chamber to inflate and expand in volume.

Figure 2B:
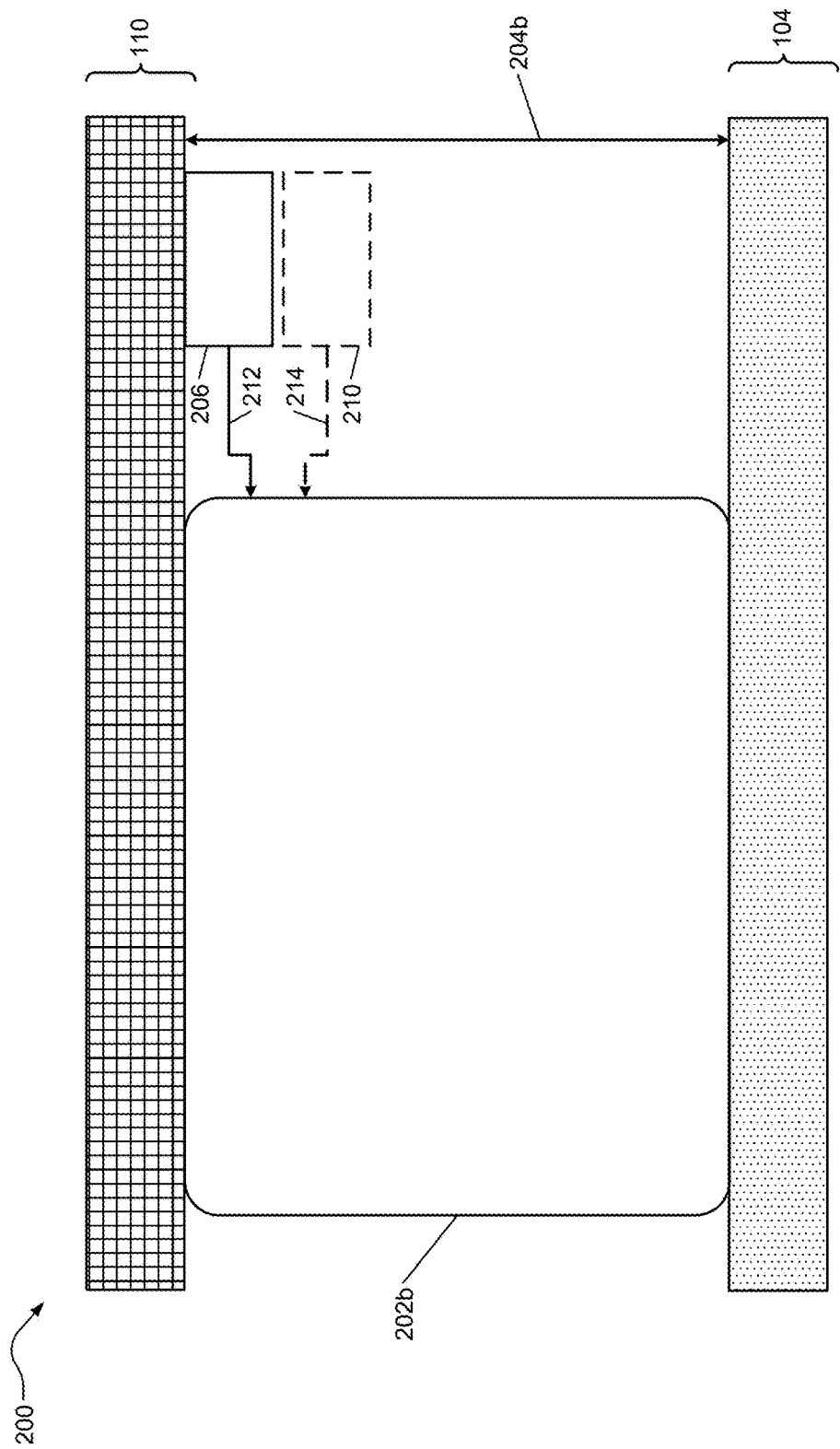
FIG. 2b is a functional block diagram of an example implementation of a roof-mounted energy absorbing countermeasure system in a post-impact state.

FIG. 2b illustrates an example implementation of the countermeasure system 200 of FIG. 2a in a post-impact state (e.g., following detection that the vehicle has experienced an impact and generation of an impact detection signal). More specifically, FIG. 2b shows a countermeasure 202b that has been deployed so as to cause at least a portion of the outer roof panel 110 to be separated from at least a portion of the inner roof panel 104 by a distance 204b, where the distance 204b is greater than the distance 204a.

Figure 2C:
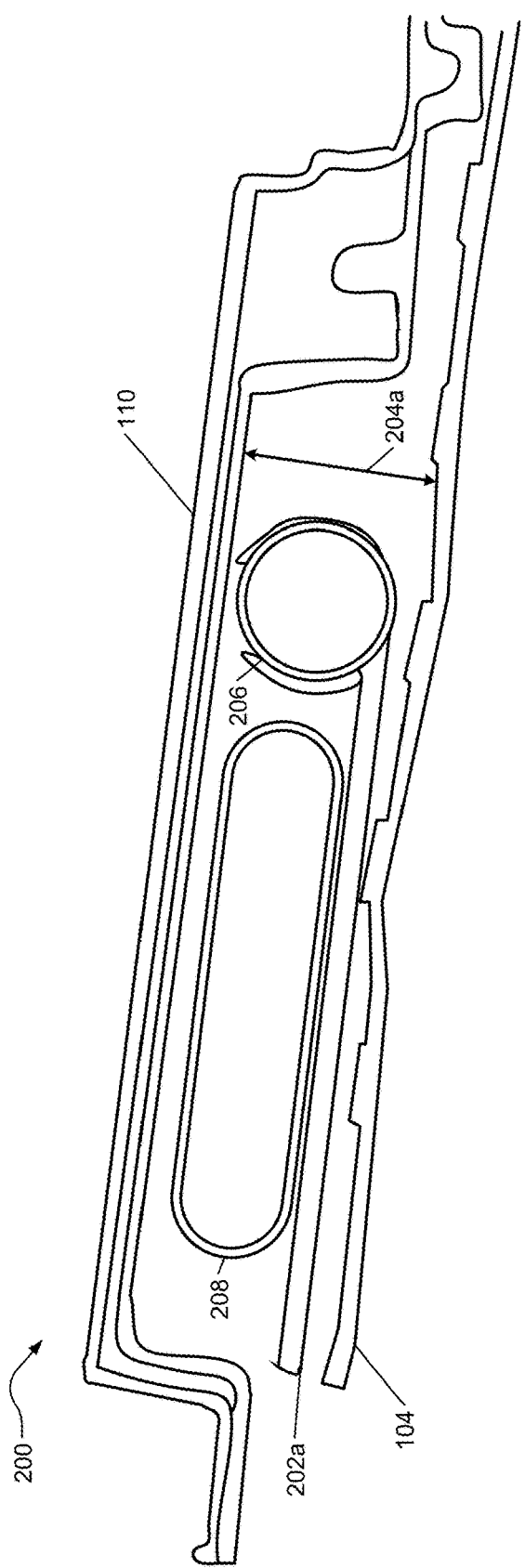

FIG. 2c is a cross-sectional view of a roof-rail of a vehicle including the example implementation of the countermeasure system 200 of FIG. 2a. As with FIG. 2a, FIG. 2c illustrates the system 200 in a pre-impact state in which the countermeasure 202a is disposed between the outer roof panel 110 and the inner roof panel 104, and operatively connected to an actuator 206. While only a pressurized cartridge-type actuator 206 is shown in FIG. 2c, those having ordinary skill will appreciate that other types of actuators (e.g., a pyrotechnic-type actuator 210) may be alternatively, or additionally, employed without deviating from the teachings of this disclosure.

Figure 2D:
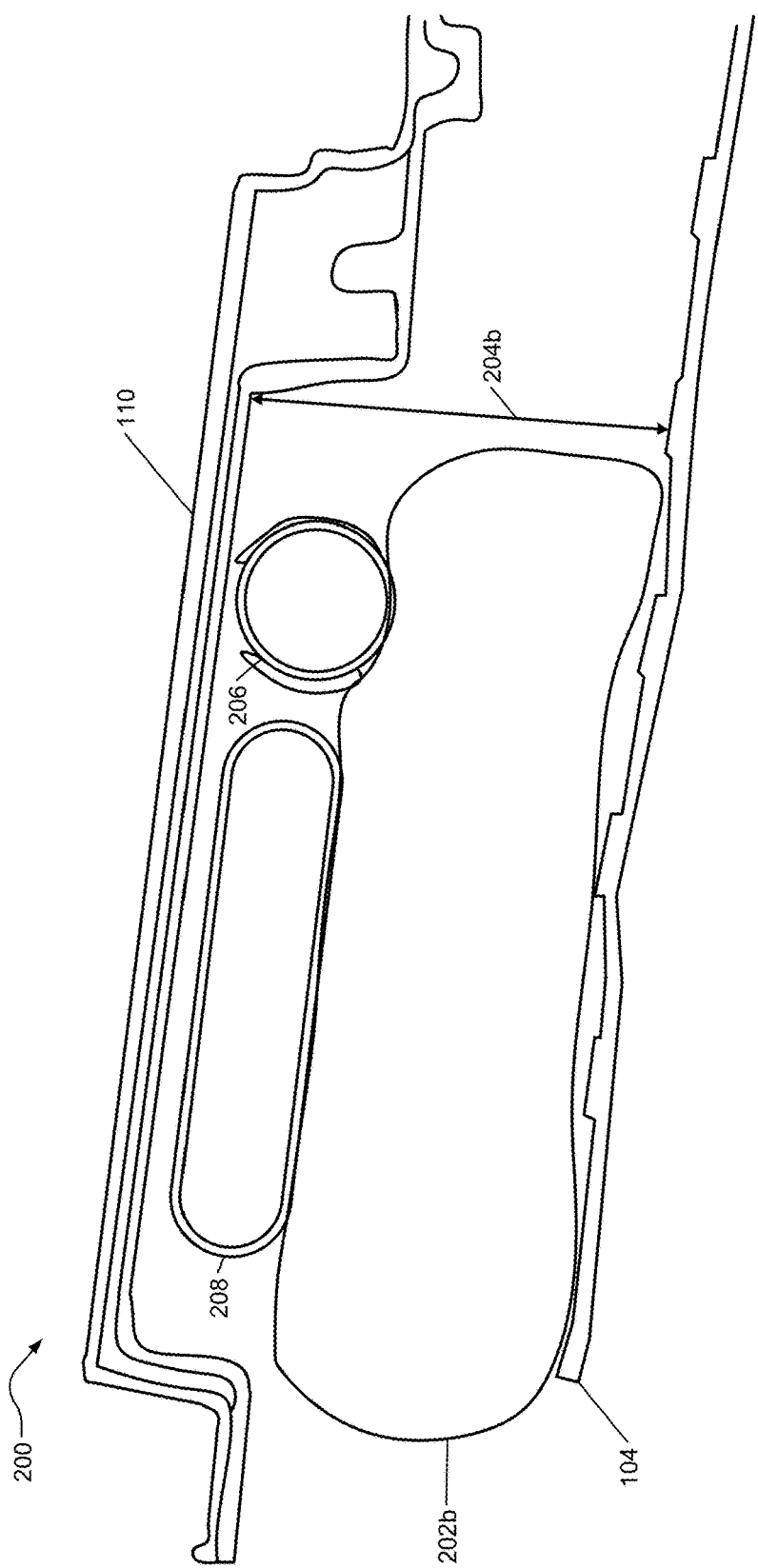
FIG. 2d is a cross-sectional view of a roof-rail of a vehicle including the example implementation of the roof-mounted energy absorbing countermeasure system of FIG. 2b.

Turning now to FIG. 2d, a cross-sectional view of a roof-rail of a vehicle including the example implementation of the countermeasure system 200 of FIG. 2b is shown. As with FIG. 2b, FIG. 2d illustrates the system 200 in a post-impact state in which the countermeasure 202b has been deployed, thereby increasing the distance between the outer roof panel 110 and the inner roof panel 104 from a first distance 204a to a second distance 204b.

Figure 3A:
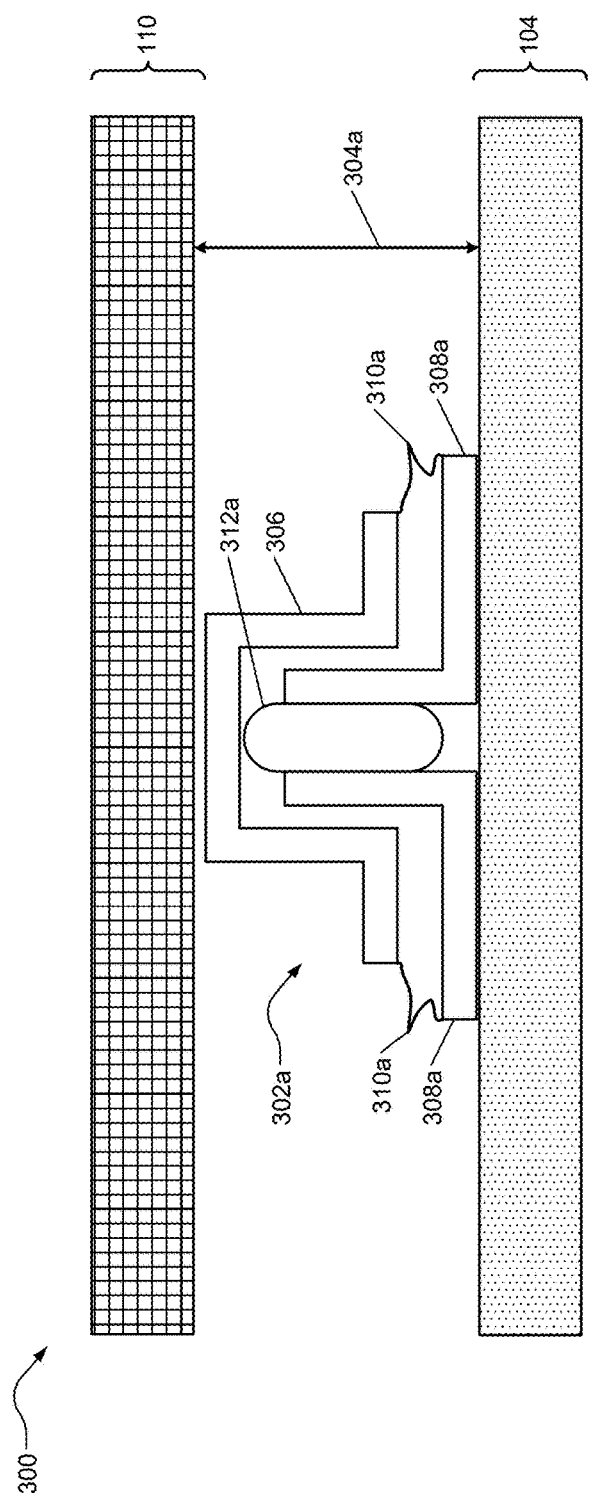
FIG. 3a is a functional block diagram of an example implementation of a roof-mounted energy absorbing countermeasure system in a pre-impact state.

FIG. 3a illustrates an example implementation of a countermeasure system 300 for use in the roof of a vehicle. More specifically, FIG. 3a shows a countermeasure 302a disposed between the outer roof panel 110 and the inner roof panel 104 in a pre-impact state. The outer roof panel 110 and the inner roof panel 104 are separated by a distance 304a. The countermeasure 302a includes an outer cup 306 having an opening facing the inner roof panel 104, an inner cup 308a disposed at least partially within the opening of the outer cup, and an actuator 312a disposed at least partially within the inner cup 308a. In addition, in some examples, the countermeasure 302a may include one or more flexible members 310a connecting the outer cup 306 to the inner cup 308a.

In one example, the outer cup 306 may constitute a more rigid material than the inner cup 308a. For example, in some implementations, the outer cup 306 may be manufactured from a rigid metal alloy such as steel, while the inner cup 308a may be manufactured from a less rigid metal alloy such as aluminum. However, the foregoing materials merely serve as examples, and the outer cup 306 and inner cup 308a may be manufactured from any suitable material(s) without deviating from the teachings of this disclosure.

Figure 3B:
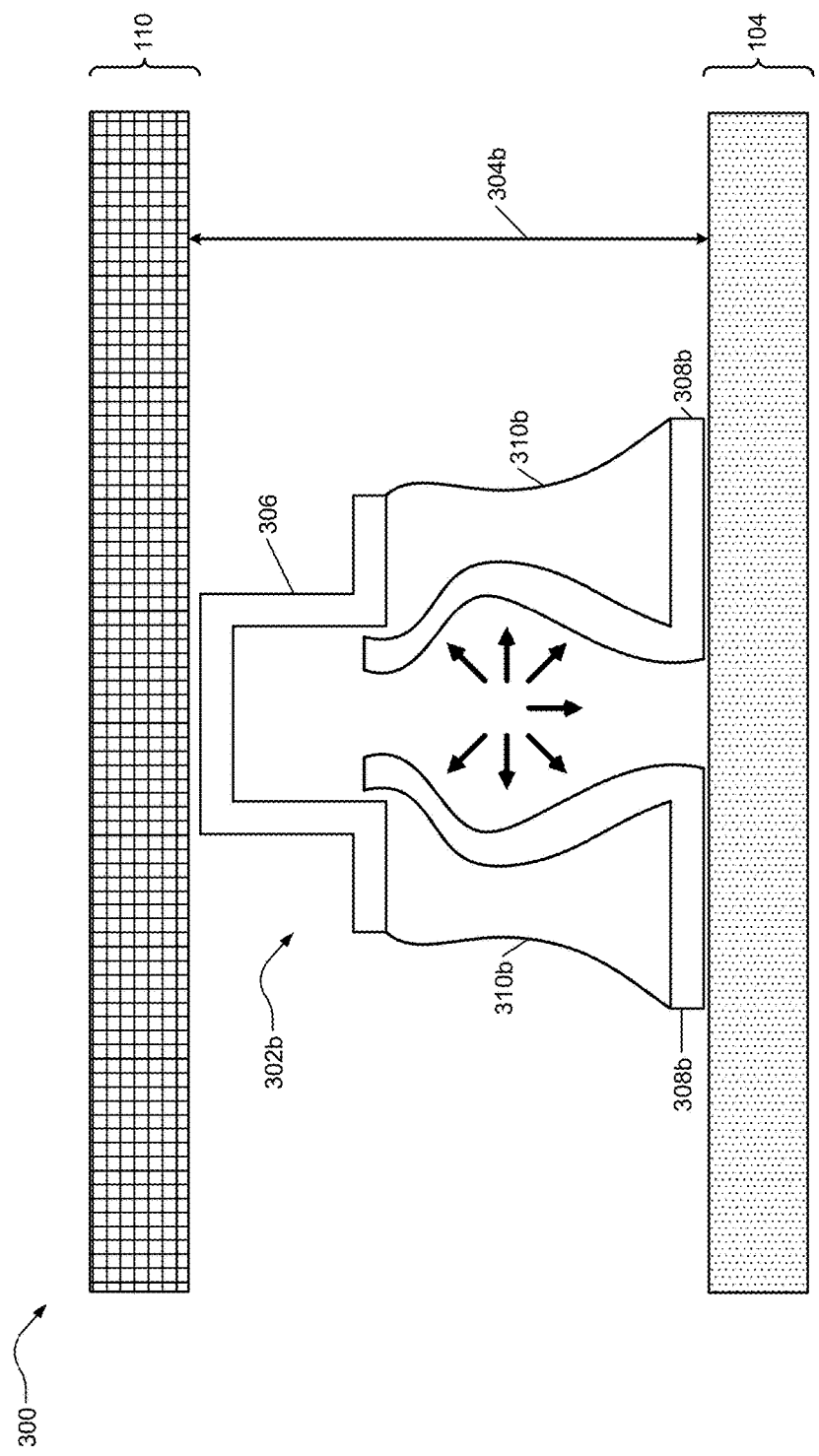
FIG. 3b is a functional block diagram of an example implementation of a roof-mounted energy absorbing countermeasure system in a post-impact state.

FIG. 3b illustrates an example implementation of the countermeasure system 300 of FIG. 3a in a post-impact state. More specifically, FIG. 3b shows a countermeasure 302b that has been deployed so as to cause at least a portion of the outer roof panel 110 to be separated from at least a portion of the inner roof panel 104 by a distance 304b, where the distance 304b is greater than the distance 304a.

In one example, the countermeasure 302b may be configured to deploy by virtue of the actuator 312a deploying in response to generation of an impact detection signal. More specifically, in this example, the actuator 312a may constitute an explosive charge or the like configured to explode upon generation of an impact detection signal. In such an example, the deployment of the actuator 312a may create a force sufficient to cause the inner cup 308b to exert a force on the inner roof panel 104, thereby increasing the distance between the outer roof panel 110 and the inner roof panel 104 from a first distance 304a (shown in FIG. 3a) to a second distance 304b (shown in FIG. 3b). In some examples, the actuator 312a may constitute a pressurized cartridge-type actuator or pyrotechnic-type actuator, such as the pressurized cartridge-type actuator 206 and pyrotechnic-type actuator 210 discussed above with regard to FIGS. 2a-2d.

In some examples, the inner cup 308b may deform upon deployment of the actuator 312a, as illustrated in FIG. 3b. In such an example, the one or more flexible members 310b may be configured to retain a connection between the outer cup 306 and the inner cup 308b following deployment of the actuator 312a and deformation of the inner cup 308b.

Figure 3C:
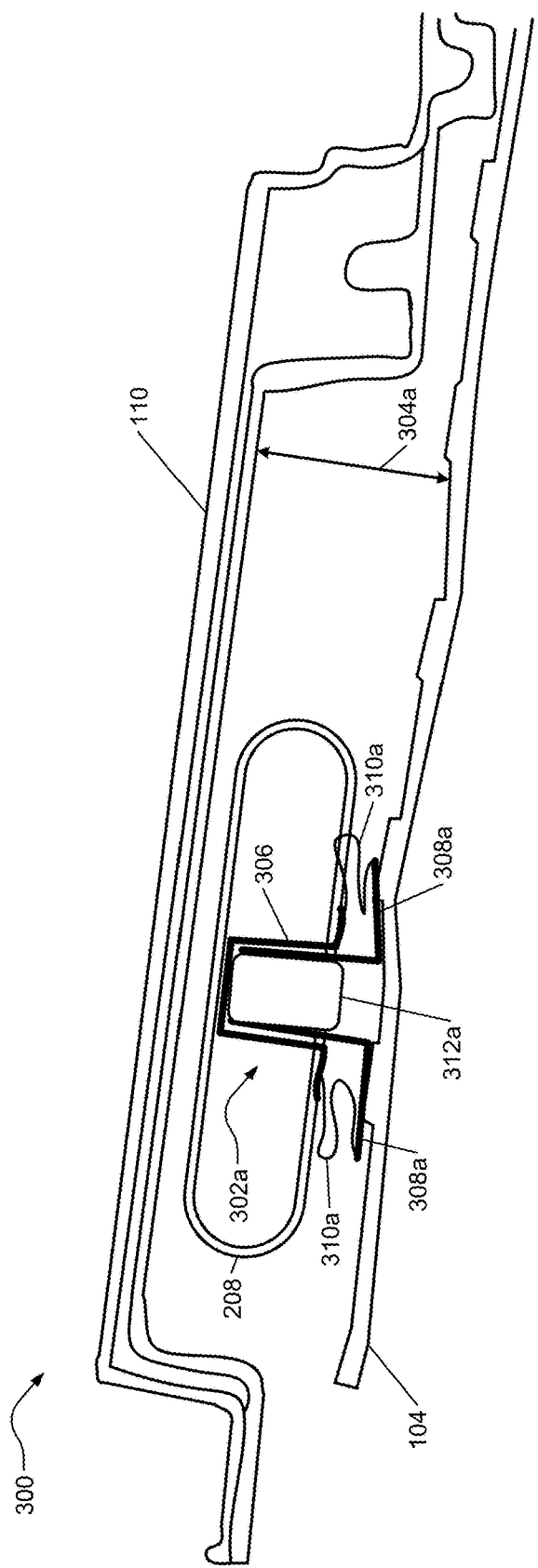

FIG. 3c is a cross-sectional view of a roof-rail of a vehicle including the example implementation of the countermeasure system 300 of FIG. 3a. As with FIG. 3a, FIG. 3c illustrates the system 300 in a pre-impact state in which the countermeasure 302a is disposed between the outer roof panel 110 and the inner roof panel 104, and includes an actuator 312a.

In this example, the outer cup 306 may be mounted to a structural box section 208 of the roof-rail via a press fit, clipped mount, or any other suitable fastening technique known in the art. The inner cup 308a may be fastened to the inner roof panel 104 (e.g., the substrate of the inner roof panel 104) via an adhesive (e.g., glue), one or more mechanical fasteners (e.g., screws, nails, etc.), chemical bonding, or any other suitable fastening technique known in the art. The outer cup 306 may be connected to the inner cup 308a via one or more flexible members 310a. In one example, the flexible member(s) 310a may constitute one or more flexible tensile tethers configured to limit the axial movement of the inner roof panel 104 following deployment of the countermeasure 302a. In addition, the flexible member(s) 310a may assist in retaining the inner roof panel 104 to the roof-rail.

The inner cup 308a may form the radial walls of the pressure vessel created when the actuator 312a is triggered, and may be configured to slide in an axial direction once pressure is applied (e.g., upon triggering of the actuator 312a). In some examples, the inner cup 308a may include metered slots or holes to vent excess pressure during triggering of the actuator 312a.

Figure 3D:
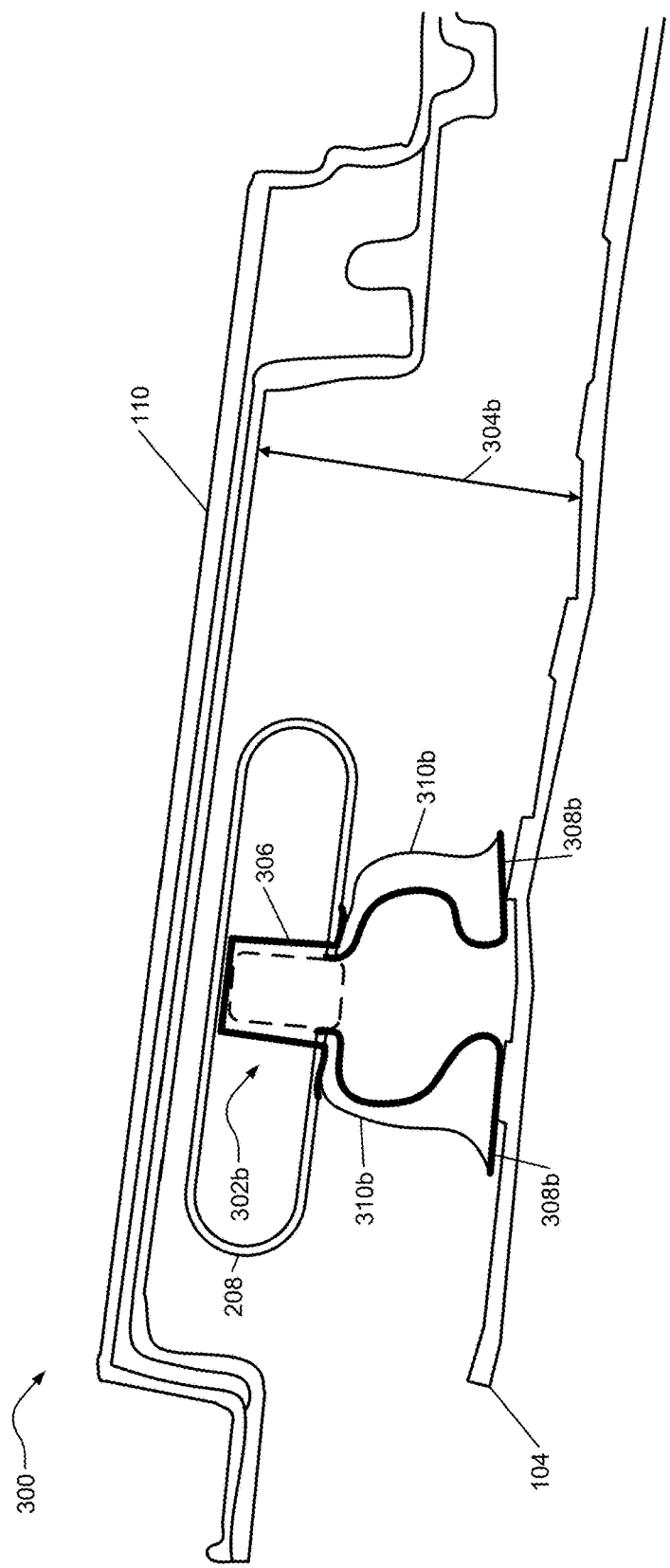
FIG. 3d is a cross-sectional view of a roof-rail of a vehicle including the example implementation of the roof-mounted energy absorbing countermeasure system of FIG. 3b.

Turning now to FIG. 3d, a cross-sectional view of a roof-rail of a vehicle including the example implementation of the countermeasure system 300 of FIG. 3b is shown. As with FIG. 3b, FIG. 3d illustrates the system 300 in a post-impact state in which the countermeasure 302b has been deployed, thereby increasing the distance between the outer roof panel 110 and the inner roof panel 104 from a first distance 304a to a second distance 304b. More specifically, FIG. 3d illustrates how, according to this example implementation, the outer cup 306 may substantially retain its structure following deployment of the countermeasure 302b, while the inner cup 308b may deform. The flexible members 310b are shown retaining the outer cup 306 to the inner cup 308b and, consequently, retaining the inner wall 104 to the roof-rail.

Figure 3E:
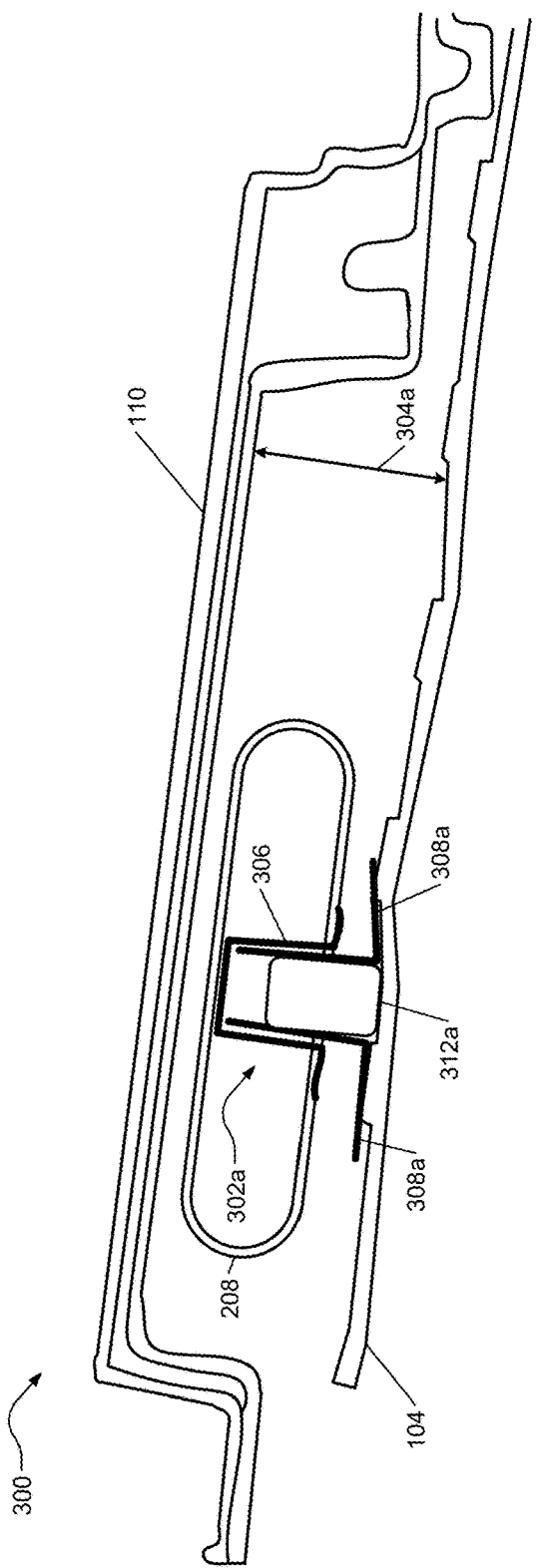
FIG. 3e is a cross-sectional view of a roof-rail of a vehicle including an example implementation of a roof-mounted energy absorbing countermeasure system in a pre-impact state.

FIG. 3e is a cross-sectional view of a roof-rail of a vehicle including an example implementation of a countermeasure system 300 in a pre-impact state. FIG. 3e is similar to FIG. 3c, however, in FIG. 3e, the actuator 312a is disposed adjacent the inner roof panel 104, leaving an axial gap between the top of the actuator 312a and the inner cup 306. In addition, FIG. 3a reflects an example implementation in which no flexible members are connected between the inner cup 308a and the outer cup 306.

Figure 3F:
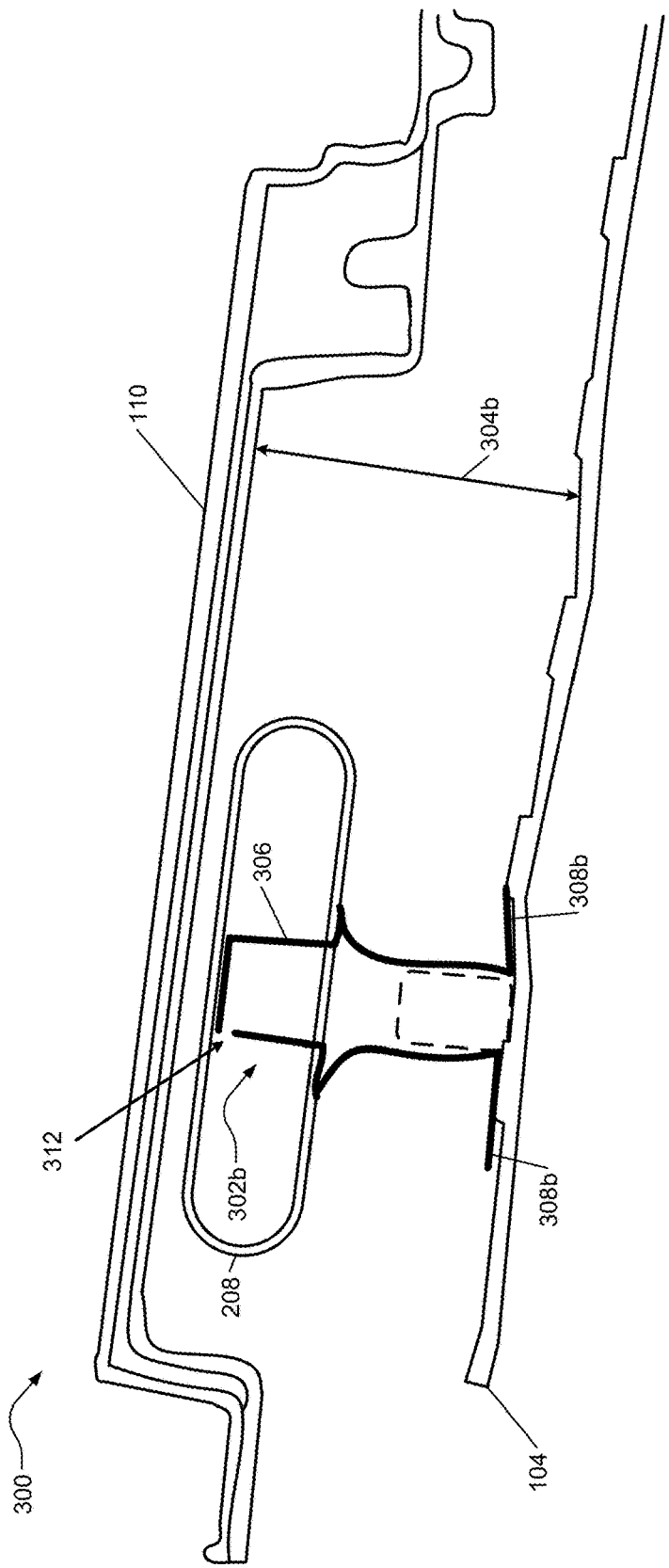
FIG. 3f is a cross-sectional view of a roof-rail of a vehicle including the example implementation of the roof-mounted energy absorbing countermeasure system shown in FIG. 3e in a post-impact state.

FIG. 3f illustrates the countermeasure system 300 of FIG. 3e in a post-impact state, but before an occupant has impacted the inner roof panel 104. As shown, the inner cup 308b has undergone a deformation following deployment of the countermeasure 302b via the actuator 312a. In addition, FIG. 3f reflects an example implementation in which the outer cup 306 includes a tunable metered orifice venting 312. The tunable metered orifice venting 312 is configured to serve as a vent to release excess pressure following the triggering (e.g., detonation) of the actuator 312a.

Figure 3G:
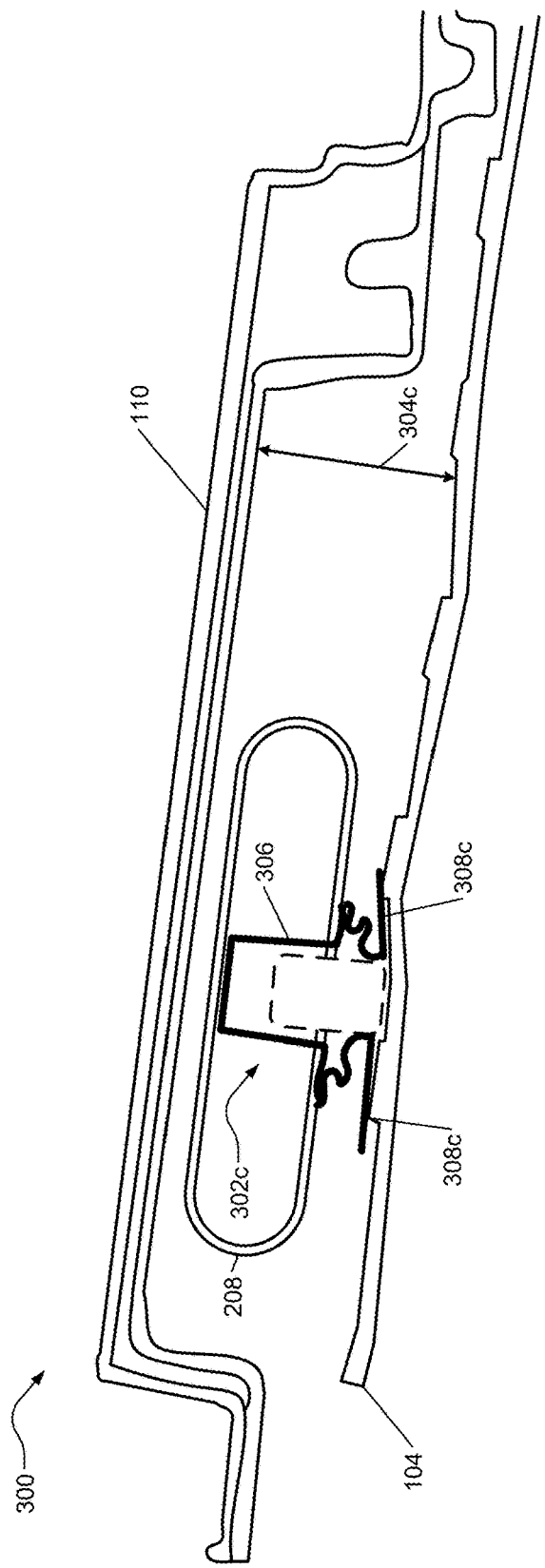
FIG. 3g is a cross-sectional view of a roof-rail of a vehicle including the example implementation of the roof-mounted energy absorbing countermeasure system shown in FIG. 3f in a post-impact state, and after an occupant has impacted the inner roof panel.

FIG. 3g illustrates the example countermeasure system 300 of FIG. 3f after a vehicle occupant has impacted the inner roof panel 104 (e.g., following a crash or rollover). As shown, the inner cup 308c has undergone further deformation relative to the state of the inner cup 308b shown in FIG. 3f. More specifically, the inner cup 308c is shown in FIG. 3g having been crushed between the inner roof panel 104 and the outer cup 306. In addition, as a result of the occupant impacting the inner roof panel 104 (e.g., via an occupant's head crashing into the bottom of the inner roof panel 104), the inner roof panel 104 has moved further towards the outer roof panel 110, relative to the distance 304b between the inner roof panel 104 and outer roof panel 110 shown in FIG. 3f. Stated differently, the distance 304c between the inner and outer roof panels 104, 110 shown in FIG. 3g is less than the distance 304b between the inner and outer roof panels 104, 110 shown in FIG. 3f.

Figure 4A:
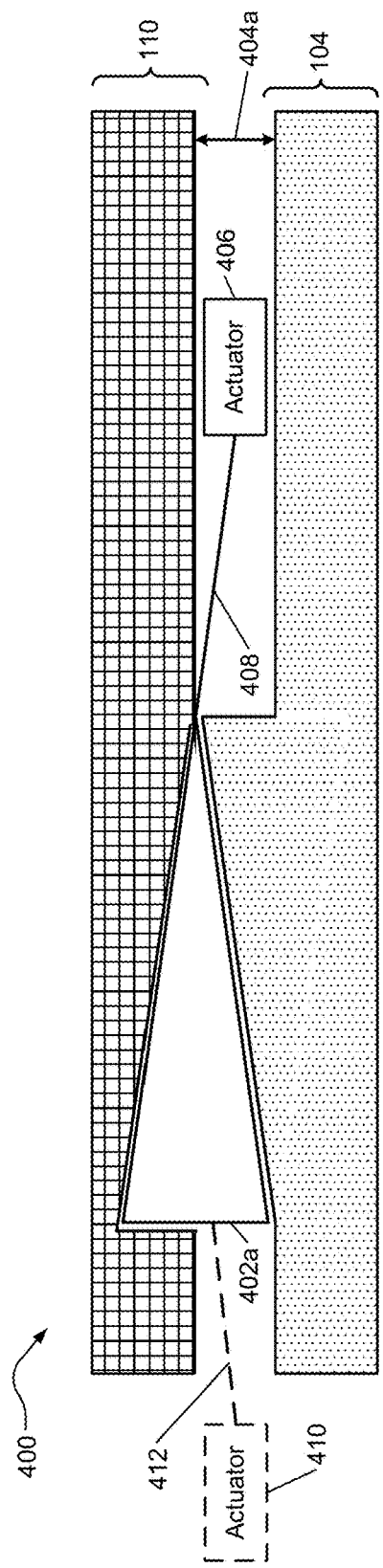
FIG. 4a is a functional block diagram of an example implementation of a roof-mounted energy absorbing countermeasure system in a pre-impact state.

FIG. 4a illustrates an example implementation of a countermeasure system 400 for use in the roof of a vehicle. More specifically, FIG. 4a shows a countermeasure 402a disposed between the outer roof panel 110 and the inner roof panel 104 in a pre-impact state. The outer roof panel 110 and the inner roof panel 104 are separated by a distance 404a. In this example, the countermeasure 402a constitutes a wedge (i.e., a solid material, such as a metal, metal alloy, or hard plastic, formed in the shape of a wedge) capable of moving from a first position to a second position upon deployment.

The countermeasure 402a may be deployed by one or more actuators, such as actuator 406 and/or actuator 410. For example, the actuator may be a pull-type actuator 406 configured to pull the countermeasure 402a from a first position to a second position via a connecting member 408. In one example, the pull-type actuator 406 may constitute a pretensioner or the like, as discussed in additional detail with regard to FIGS. 8a-8b below. In another example, the actuator may be a push-type actuator 410 configured to push the countermeasure 402a from the first position to the second position via a connecting member 412. In one example, the push-type actuator 410 may constitute a push rod or the like, as discussed in additional detail with regard to FIGS. 8a-8b below.

In addition, as shown in FIG. 4a, in some examples, the inner roof panel 104 may include a complementary wedge portion (shown below the wedged countermeasure 402a in FIG. 4a) configured to absorb a force from the wedged countermeasure 402a upon deployment of the wedged countermeasure 402a.

Figure 4B:
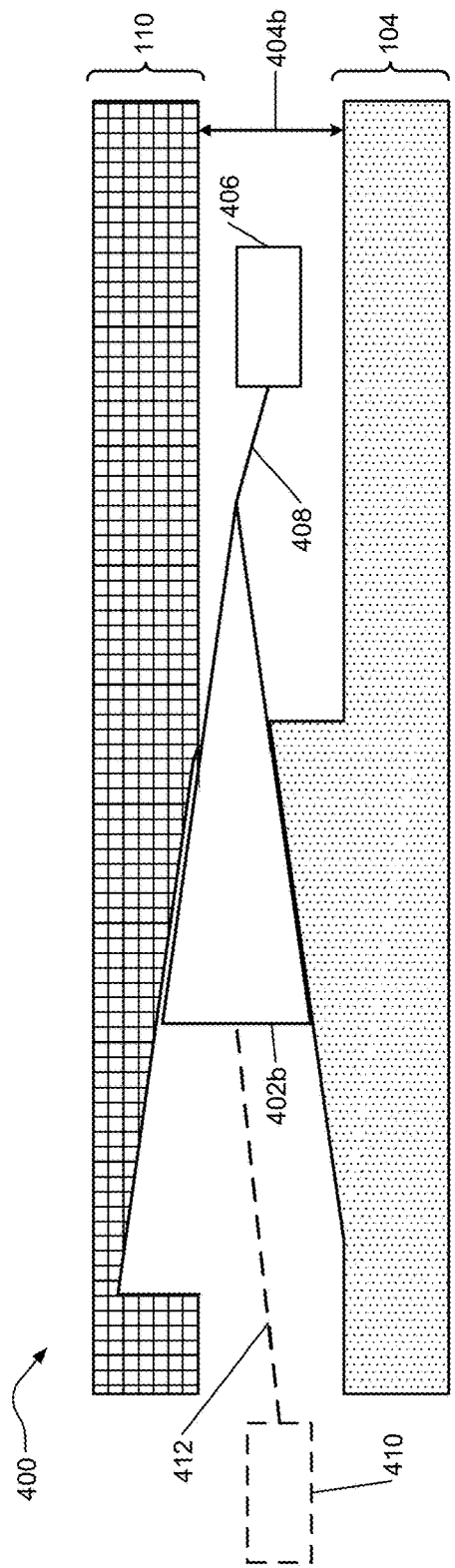
FIG. 4b is a functional block diagram of an example implementation of a roof-mounted energy absorbing countermeasure system in a post-impact state.

FIG. 4b illustrates an example implementation of the countermeasure system 400 of FIG. 4a in a post-impact state. More specifically, FIG. 4b shows a countermeasure 402b that has been deployed so as to cause at least a portion of the outer roof panel 110 to be separated from at least a portion of the inner roof panel 104 by a distance 404b, where the distance 404b is greater than the distance 404a.

In one example, the countermeasure 402b may be configured to deploy, in response to generation of an impact detection signal, by virtue of the actuator 406 pulling the countermeasure 402b from a first position (e.g., the position shown in FIG. 4a) to a second position (e.g., the position shown in FIG. 4b). In another example, the countermeasure 402b may be configured to deploy, in response to generation of an impact detection signal, by virtue of the actuator 410 pushing the countermeasure 402b from a first position (e.g., the position shown in FIG. 4a) to a second position (e.g., the position shown in FIG. 4b).

As shown in FIG. 4b, deployment of the wedged countermeasure 402b causes a portion of the wedged countermeasure 402b (i.e., the bottom edge of the wedged countermeasure 402b) to exert a force on the complementary wedged portion of the inner roof panel 104, thereby increasing the distance between the outer roof panel 110 and the inner roof panel 104.

Figure 5A:
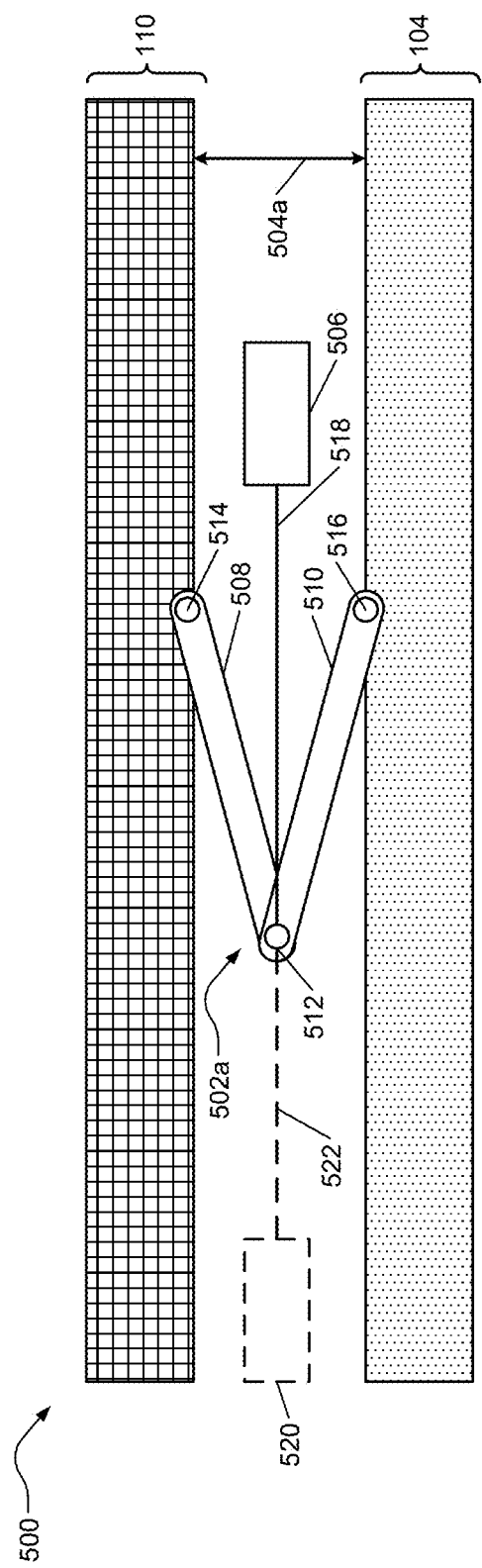
FIG. 5a is a functional block diagram of an example implementation of a roof-mounted energy absorbing countermeasure system in a pre-impact state.

FIG. 5a illustrates an example implementation of a countermeasure system 500 for use in the roof of a vehicle. More specifically, FIG. 5a shows a countermeasure 502a disposed between the outer roof panel 110 and the inner roof panel 104 in a pre-impact state. The outer roof panel 110 and the inner roof panel 104 are separated by a distance 504a. In the example implementation shown in FIG. 5a, the countermeasure 502a constitutes a hinged expander. In one example, the hinged expander many be manufactured from a rigid material, such as a metal or hard plastic, although other materials may be suitably employed.

The hinged expander countermeasure 502a may include a first arm 508 and a second arm 510. The first arm 508 may include a first end connected to the outer roof panel 110 by a fastener 514 and a second end connected to a hinge 512. The second arm 510 may include a first end connected to the inner roof panel 104 by a fastener 516 and a second end connected to the hinge 512. The fasteners 514, 516 may include any suitable types of fasteners known in the art for achieving mechanical connections between the roof panels 104, 110 and the arms 508, 510 of the countermeasure 502a. In one example, each fastener 514, 516 may constitute a fastening system including a male portion (e.g., via hooked first ends of the arms 508, 510) configured to make a locking connection with a female portion (e.g., a slots within the inner and outer roof panels 104, 110).

The countermeasure 502a is operatively connected to an actuator, such as actuator 506 or actuator 520, configured to deploy the countermeasure 502a following detection that the vehicle has experienced an impact and generation of an impact detection signal. In one example, the actuator may be a pull-type actuator 506 configured to pull the hinge 512 of the countermeasure 502a from a first position to a second position via a connecting member 518. In one example, the pull-type actuator 506 may constitute a pretensioner or the like, as discussed in additional detail with regard to FIGS. 8a-8b below. In another example, the actuator may be a push-type actuator 520 configured to push the hinge 512 of the countermeasure 502a from the first position to the second position via a connecting member 522. In one example, the push-type actuator 520 may constitute a push rod or the like, as discussed in additional detail with regard to FIGS. 8a-8b below.

Figure 5B:
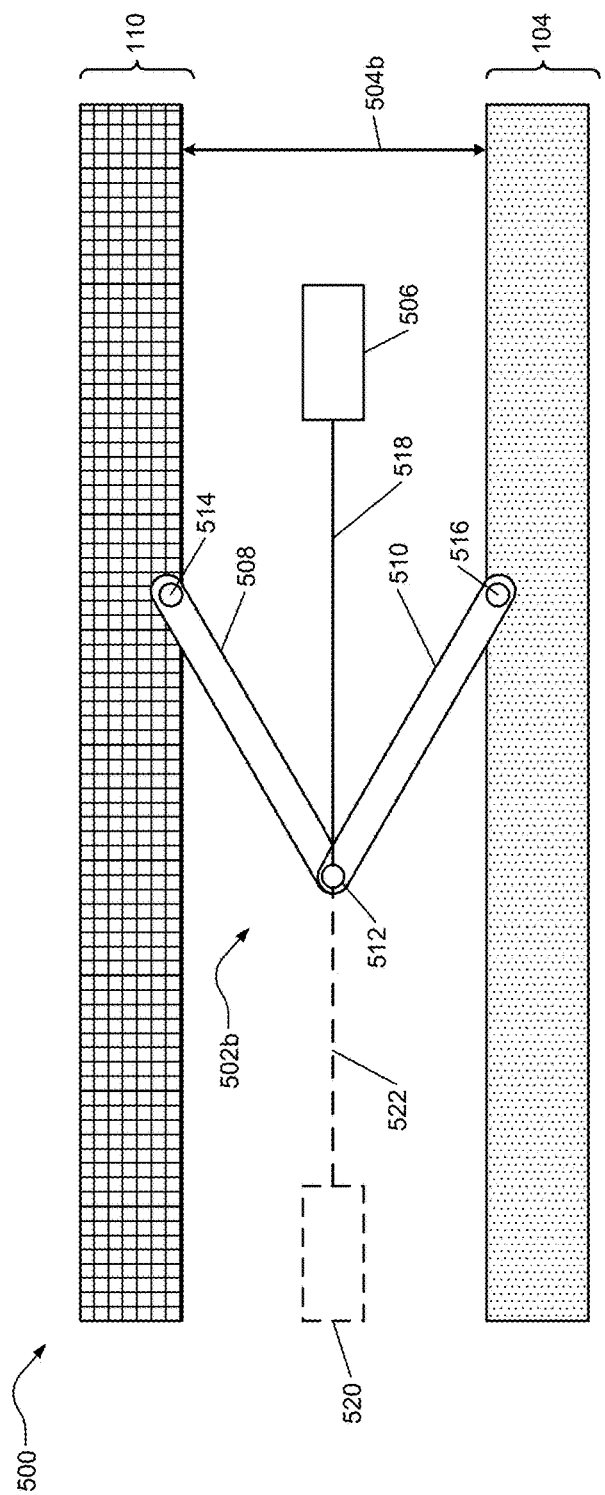
FIG. 5b is a functional block diagram of an example implementation of a roof-mounted energy absorbing countermeasure system in a post-impact state.

FIG. 5b illustrates an example implementation of the countermeasure system 500 of FIG. 5a in a post-impact state. More specifically, FIG. 5b shows a countermeasure 502b that has been deployed so as to cause at least a portion of the outer roof panel 110 to be separated from at least a portion of the inner roof panel 104 by a distance 504b, where the distance 504b is greater than the distance 504a. In the example shown in FIG. 5b, the countermeasure 502b is configured to deploy by expanding in a direction perpendicular to the outer roof panel 110.

In one example, the countermeasure 502b may be configured to deploy, in response to generation of an impact detection signal, by virtue of the actuator 506 pulling at least a portion of the countermeasure 502b (e.g., the hinge 512) via the connecting member 518 from a first position (e.g., the position shown in FIG. 5a) to a second position (e.g., the position shown in FIG. 5b). In another example, the countermeasure 502b may be configured to deploy, in response to generation of an impact detection signal, by virtue of the actuator 520 pushing at least a portion of the countermeasure 502b (e.g., the hinge 512) via the connecting member 522 from a first position (e.g., the position shown in FIG. 5a) to a second position (e.g., the position shown in FIG. 5b).

Figure 6A:
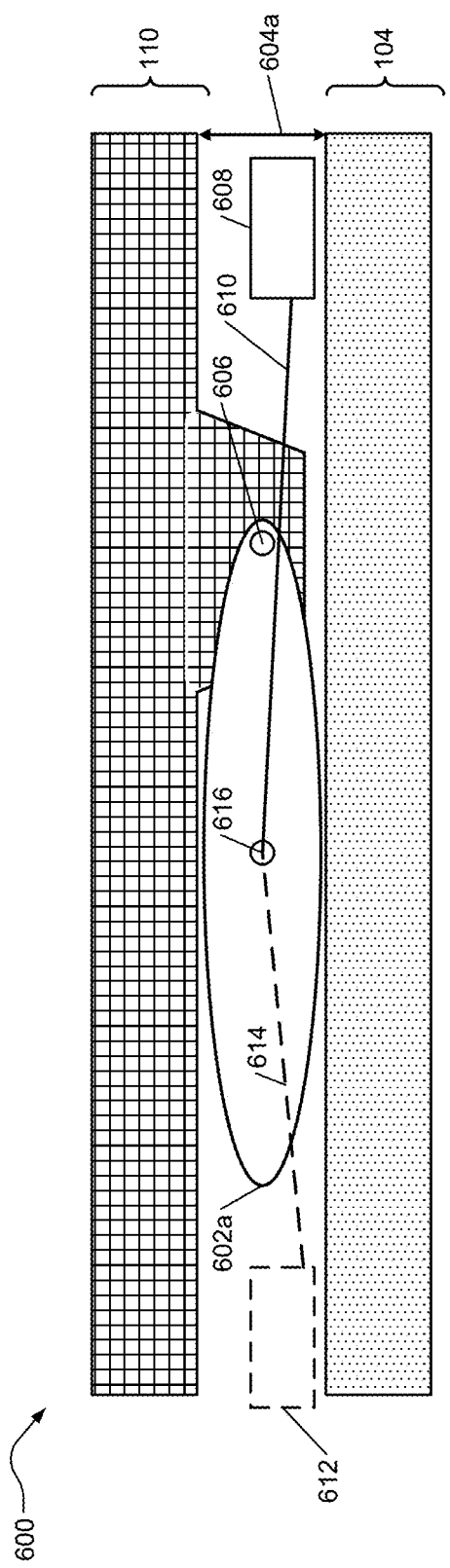
FIG. 6a is a functional block diagram of an example implementation of a roof-mounted energy absorbing countermeasure system in a pre-impact state.

FIG. 6a illustrates an example implementation of a countermeasure system 600 for use in the roof of a vehicle. More specifically, FIG. 6a shows a countermeasure 602a disposed between the outer roof panel 110 and the inner roof panel 104 in a pre-impact state. In the pre-impact state, the outer roof panel 110 and the inner roof panel 104 are separated by a distance 604a. In the example implementation shown in FIG. 6a, the countermeasure 602a constitutes a rotating cam. In this example, the rotating cam countermeasure 602a may include a first end and a second end rotatably connected to the outer roof panel 110 at a pivot point 606. The countermeasure 602a is configured to deploy by rotating about the pivot point 606, as shown in the transition from FIG. 6a to FIG. 6b.

Figure 6B:
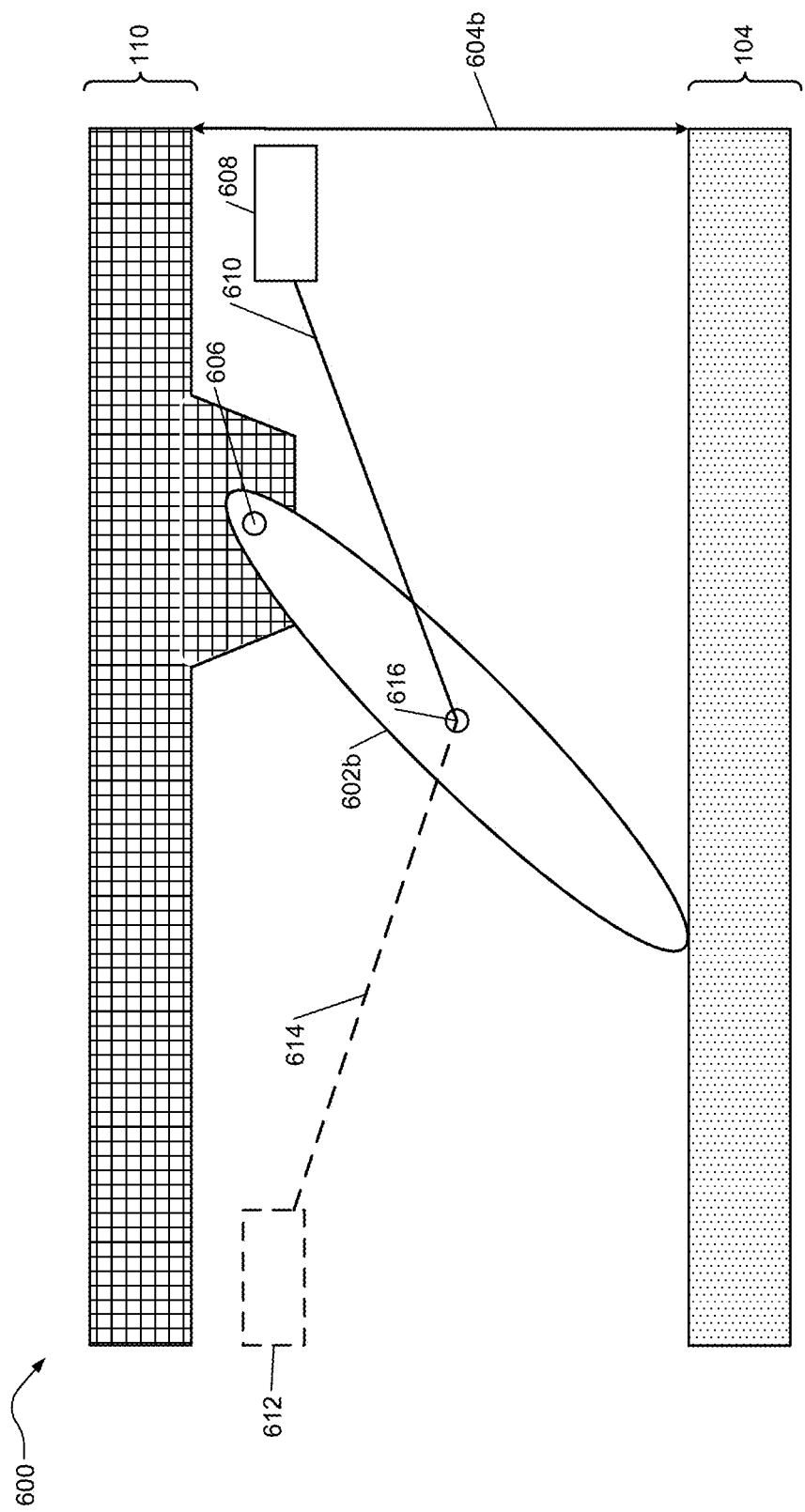
FIG. 6b is a functional block diagram of an example implementation of a roof-mounted energy absorbing countermeasure system in a post-impact state.

The countermeasure 602a is operatively connected to an actuator, such as actuator 608 or actuator 612, configured to deploy the countermeasure 602a following detection that the vehicle has experienced an impact and generation of an impact detection signal. In one example, the actuator may be a pull-type actuator 608 configured to pull the countermeasure 602a from a first position to a second position via a connecting member 610, which attaches to the countermeasure 602a at an attachment point 616. Although FIGS. 6a-6b illustrate the attachment point being located at the center of the countermeasure 602a, those having ordinary skill will recognize that the attachment point 616 could be located at various other suitable locations on the countermeasure 602a without deviating from the teachings of this disclosure. In one example, the pull-type actuator 608 may constitute a pretensioner or the like, as discussed in additional detail with regard to FIGS. 8a-8b below. In another example, the actuator may be a push-type actuator 612 configured to push the countermeasure 602a from the first position to the second position via a connecting member 614, which attaches to the countermeasure 602a at the attachment point 616. In one example, the push-type actuator 612 may constitute a push rod or the like, as discussed in additional detail with regard to FIGS. 8a-8b below.

FIG. 6b illustrates an example implementation of the countermeasure system 600 of FIG. 6a in a post-impact state. More specifically, FIG. 6b shows a countermeasure 602b that has been deployed so as to cause at least a portion of the outer roof panel 110 to be separated from at least a portion of the inner roof panel 104 by a distance 604b, where the distance 604b is greater than the distance 604a.

In one example, the countermeasure 602b may be configured to deploy, in response to generation of an impact detection signal, by virtue of the pull-type actuator 608 pulling at least a portion of the countermeasure 602b (e.g., the first end) from a first position (e.g., the position shown in FIG. 6a) to a second position (e.g., the position shown in FIG. 6b). In another example, the countermeasure 602b may be configured to deploy, in response to generation of an impact detection signal, by virtue of the push-type actuator 612 pushing at least a portion of the countermeasure 602b from a first position (e.g., the position shown in FIG. 6a) to a second position (e.g., the position shown in FIG. 6b).

Figure 7:
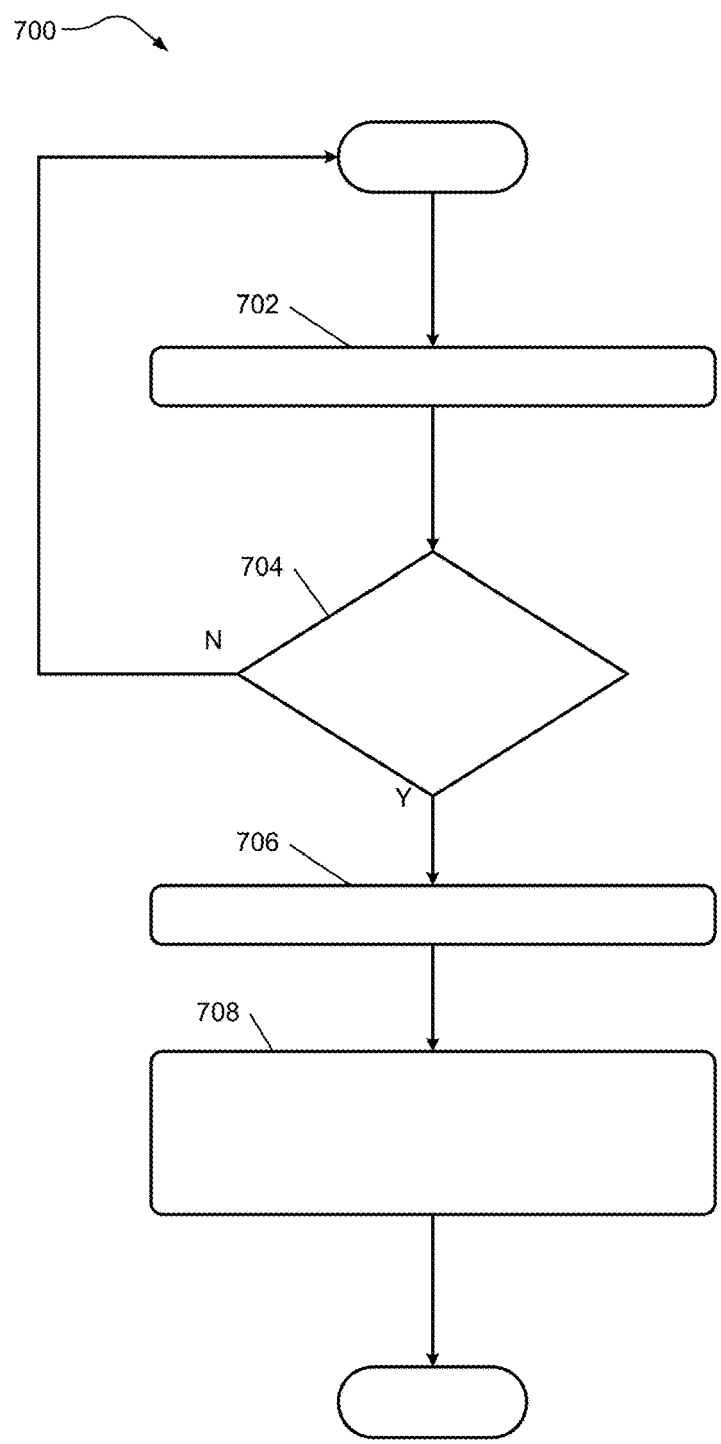
FIG. 7 is a flowchart illustrating an example method for deploying a roof-mounted energy absorbing countermeasure upon detection of an impact.

Referring now to FIG. 7, a flowchart illustrating an example method 700 of deploying a countermeasure is provided. The method 700 begins at 702 where sensors signals are obtained from vehicle sensors of a vehicle. At 704, it is determined whether the vehicle has experienced an impact based on, for example, the obtained sensor signals. If it is determined that the vehicle has not experienced an impact, the method returns to the start. However, if it is determined that the vehicle has experienced an impact, the method continues to 706 where an impact detection signal is generated. At 708, one or more countermeasures are deployed based on the impact detection signal. The one or more countermeasures are configured to increase the distance between an outer roof panel and an inner roof panel of the vehicle. Following 708, the method ends.

Figure 8A:
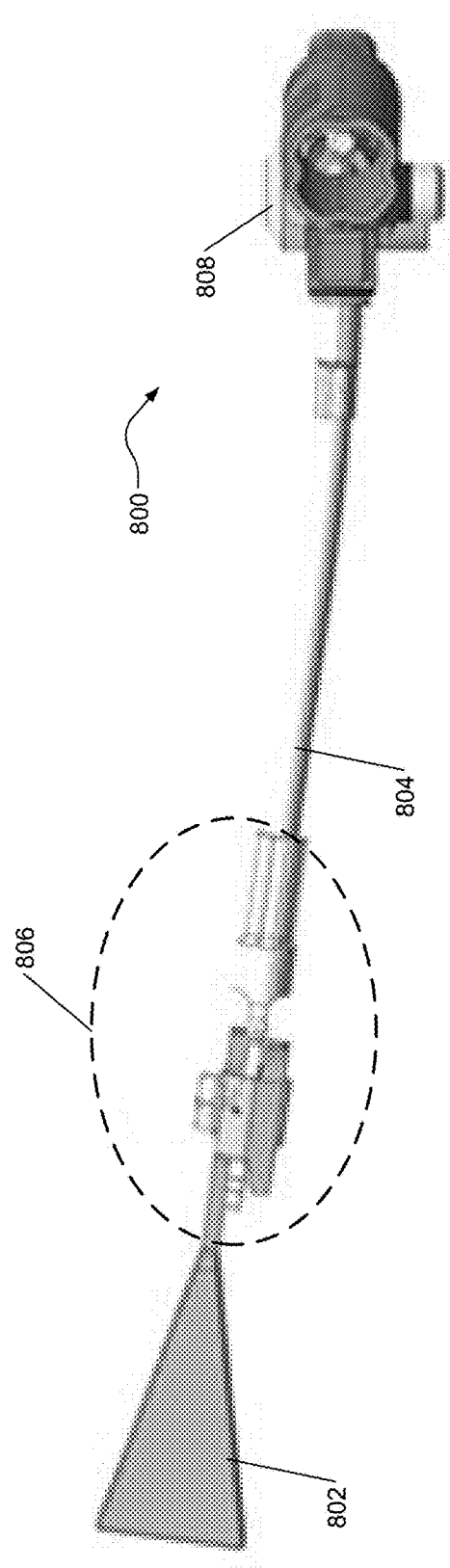
FIG. 8a is an isometric view of an example actuator for deploying a roof-mounted energy absorbing countermeasure.

FIG. 8a is an isometric view of an example pull-type or push-type actuator 800, which may be used to deploy a countermeasure 802 according to various implementations. The actuator 800 includes a body 808, connecting member 804, and connector 806.

The connector 806 is configured to connect with a countermeasure 802. Although the countermeasure 802 shown in FIGS. 8a-8b is a wedge-type countermeasure, it is recognized that other countermeasure structures (e.g., a hinged expander or rotating cam) could be suitably connected to the actuator 800 via the connector 806.

The connecting member 804 connects the connector 806 to the actuator body 808. In an example where the actuator 800 is a pull-type actuator, such as a pretentioner, the connecting member 804 may be a flexible material, such as a woven fabric or cord, capable of bending when pulled through the body 808 of the actuator 800 when the actuator 800 is triggered. In an example where the actuator 800 is a push-type actuator, such as a push rod, the connecting member 804 may be rigid and not susceptible to substantial deformation. In such an example, the connecting member 804 may be manufactured from a rigid material, such as metal or plastic. In this manner, mechanical energy from the actuator body 808 may be transferred through the connecting member 804 and connector 806 to exert a force on the countermeasure 802 and move the countermeasure from a first position to a second position.

The body 808 of the actuator 800 is configured to receive an impact detection signal and effectuate a movement of the connecting member 804 (and, consequently, the countermeasure 802) in response thereto. In one example, the body 808 houses an electric motor that may be activated upon reception of the impact detection signal (which signal may be mechanical or electrical in nature) to push/pull the connecting member 804. In another example, a solenoid housed in the body 808 may be activated upon reception of the impact detection signal to push/pull the connecting member 804. In still another example, a pyrotechnic system housed in the body 808 may be activated upon reception of the impact detection signal to push/pull the connecting member 804. Those having ordinary skill in the art will recognize that the foregoing examples are non-limiting and that other suitable mechanisms for affecting a lateral movement of the connecting member 804 may be equally employed.

Figure 8B:
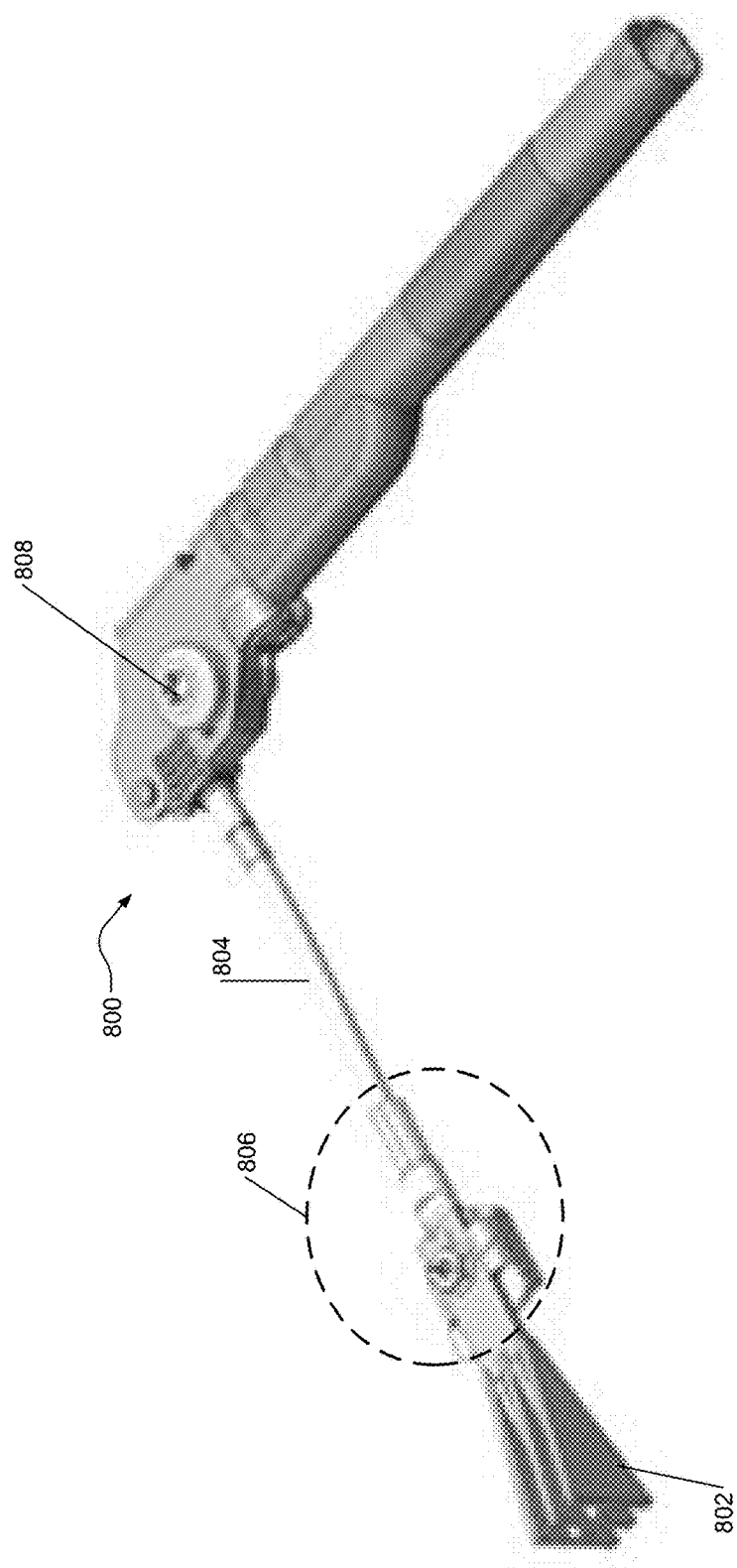
FIG. 8b is another isometric view of the example actuator for deploying the roof-mounted energy absorbing countermeasure.

FIG. 8b is another isometric view of the actuator 800 showing the actuator body 808, connecting member 804, and connector 806, connected to an example countermeasure 802. In one example, the actuator 800 may be housed in the roof-rail of a vehicle, substantially in the same axial plane as the countermeasure 802.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the erm "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    an impact detection module configured to:
        detect whether a vehicle has experienced an impact; and
        in response to detecting that the vehicle has experienced an impact, generate an impact detection signal; and
    a countermeasure disposed between an outer roof panel of the vehicle and an inner roof panel of the vehicle, wherein the outer roof panel and the inner roof panel are separated by a first distance in a pre-impact state, and wherein the countermeasure is configured to:
        deploy, in response to generation of the impact detection signal, so as to cause at least a portion of the outer roof panel and at least a portion of the inner roof panel to be separated by a second distance, wherein the second distance is greater than the first distance,
    wherein the countermeasure comprises:
        an outer cup having an opening facing the inner roof panel;
        an inner cup disposed at least partially within the opening of the outer cup; and
        an actuator disposed at least partially within the inner cup, wherein the actuator is configured to deploy in response to generation of the impact detection signal so as to cause the inner cup to exert a force on the inner roof panel.

2. The system of claim 1, wherein the actuator is configured to deploy by inflating.

3. The system of claim 1, wherein the actuator is configured to deploy by exploding.

4. The system of claim 1, wherein the outer cup is more rigid than the inner cup.

5. The system of claim 1, wherein the countermeasure further comprises one or more flexible members connecting the outer cup to the inner cup.

6. The system of claim 5, wherein the one or more flexible members comprise at least one flexible tensile tether that is configured to limit axial movement of the inner roof panel after deployment of the countermeasure.

7. The system of claim 1, wherein the inner roof panel of the vehicle comprises a trim layer.

8. The system of claim 7, wherein the inner roof panel of the vehicle further comprises a substrate layer adjacent the trim layer.

9. The system of claim 1, wherein the inner cup is fastened to the inner roof panel via an adhesive.

10. The system of claim 1, wherein the inner cup is fastened to the inner roof panel via one or more mechanical fasteners.

11. The system of claim 1, wherein the inner cup is fastened to the inner roof panel via chemical bonding.

12. The system of claim 1, wherein the inner cup is configured to form radial walls of a pressure vessel that is created when the actuator is triggered.

13. The system of claim 12, wherein the inner cup is configured to slide in an axial direction when the actuator is triggered.

\* \* \* \* \*